US009473599B2

(12) United States Patent
Wisehart (10) Patent No.: US 9,473,599 B2
(45) Date of Patent: Oct. 18, 2016

(54) HIGH PAYLOAD DATA PACKET TRANSMISSION SYSTEM AND RELAY TO LOWER LATENCY

(71) Applicant: SMG HOLDINGS—ANOVA TECHNOLOGIES, LLC, Chicago, IL (US)

(72) Inventor: Daniel J. Wisehart, Mission Viejo, CA (US)

(73) Assignee: SMG Holdings—Anova Technologies, LLC, Chicago, IL (US)

( * ) Notice: Subject to any disclaimer, the term of this patent is extended or adjusted under 35 U.S.C. 154(b) by 0 days.

(21) Appl. No.: 14/485,269

(22) Filed: Sep. 12, 2014

(65) Prior Publication Data

US 2015/0078383 A1    Mar. 19, 2015

Related U.S. Application Data

(60) Provisional application No. 61/877,392, filed on Sep. 13, 2013.

(51) Int. Cl.
*H04J 3/24* (2006.01)
*H04L 29/06* (2006.01)
(Continued)

(52) U.S. Cl.
CPC ............. *H04L 69/22* (2013.01); *H04L 45/745* (2013.01); *H04L 49/552* (2013.01); *H04L 29/06* (2013.01);
(Continued)

(58) Field of Classification Search
CPC ....... H04L 5/745; H04L 9/552; H04L 69/22; H04L 69/04; H04L 29/06; H04L 61/1552; H04L 61/1582; H04L 61/6009; H04L 61/6072; H04L 61/2076; H04L 61/2053; H04L 47/365

USPC .......................... 370/473, 474, 476
See application file for complete search history.

(56) References Cited

U.S. PATENT DOCUMENTS 5,161,191 A * 11/1992 Gupta et al. .................... 380/37
5,247,626 A    9/1993 Firoozmand
(Continued)

FOREIGN PATENT DOCUMENTS

WO    WO2008130110    10/2008

OTHER PUBLICATIONS

"Flexilink: a unified low latency network architecture for multi-channel live audio", Yonghao Wang et al., Oct. 26-29, 2012, Audio Engineering Society Convention paper.*
(Continued)

*Primary Examiner* — Peter Cheng
(74) *Attorney, Agent, or Firm* — Gould & Ratner LLP (57) ABSTRACT

The invention provides a method of forming s custom data packet for a point-to-point trunk network, the method comprising the steps of providing a First-In First-Out (FIFO) register to capture data packets transmitted via a packet-switched computer network at speeds equal to or greater than 1 Gbps, the packet switched data packets having a packet switched header and a packet switched frame check sequence (FCS), providing selectors connected to the FIFO outputs, each selector receiving a packet-switched data packet and stripping out the packet-switched header and replacing if with a mini-header and filling each stripped data packet with 1 to 1,500 bytes of customer data to transform each data packet to a high payload data packet, replacing the packet-switched FCS with a mini-FCS. Sending each high payload data packet across the point-to-point trunk network having a reduced latency of less-than 1 microsecond for roundtrip transmission and recreating the standard packet-switched data packet based on the mini-header and mini-FCS.

20 Claims, 4 Drawing Sheets

(51) Int. Cl.
*H04L 12/741* (2013.01)
*H04L 12/939* (2013.01)
*H04L 29/12* (2006.01)
*H04L 12/805* (2013.01)

(52) U.S. Cl.
CPC .......... *H04L 47/365* (2013.01); *H04L 61/1552* (2013.01); *H04L 61/1582* (2013.01); *H04L 61/2053* (2013.01); *H04L 61/2076* (2013.01); *H04L 61/6009* (2013.01); *H04L 61/6072* (2013.01); *H04L 69/04* (2013.01)

(56) References Cited

U.S. PATENT DOCUMENTS

| | | | |
|---|---|---|---|
| 5,459,723 A | 10/1995 | Thor | |
| 6,011,615 A * | 1/2000 | Mamyshev et al. | 356/73.1 |
| 6,430,201 B1 | 8/2002 | Azizoglu et al. | |
| 6,680,945 B1 | 1/2004 | Merchant et al. | |
| 7,283,747 B2 | 10/2007 | Schofield et al. | |
| 7,339,923 B2 | 3/2008 | Rogers | |
| 7,366,208 B2 | 4/2008 | Bowes | |
| 7,570,643 B2 * | 8/2009 | Prasad et al. | 370/392 |
| 7,720,094 B2 | 5/2010 | Turner et al. | |
| 8,490,110 B2 | 7/2013 | Hoover et al. | |
| 8,532,106 B2 * | 9/2013 | Gandham et al. | 370/392 |
| 2005/0002265 A1 * | 1/2005 | Cassiers et al. | 365/232 |
| 2005/0165968 A1 | 7/2005 | Natarajan et al. | |
| 2007/0086392 A1 | 4/2007 | Sinnarajah et al. | |
| 2007/0147238 A1 | 6/2007 | Kadambi | |
| 2008/0069125 A1 | 3/2008 | Reed | |
| 2009/0034526 A1 | 2/2009 | Ahmadi et al. | |
| 2009/0196303 A1 * | 8/2009 | Battle et al. | 370/403 |
| 2010/0142560 A1 | 6/2010 | Sharivker et al. | |
| 2010/0191856 A1 | 7/2010 | Gupta et al. | |
| 2010/0284692 A1 | 11/2010 | Szell et al. | |
| 2011/0153820 A1 | 6/2011 | Atkinson | |
| 2013/0129005 A1 | 5/2013 | Xia et al. | |

OTHER PUBLICATIONS

Flexilink: A unified low latency network architecture for multichannel live audio; Oct. 26, 2012; http://webspace.qmul.ac.uk/yonghaow/paper/%5B5%5D%20Flexilink%20%Low%latency%-20audio%20network%20AES%20133version4-5.pdf.

* cited by examiner

HIGH PAYLOAD DATA PACKET TRANSMISSION SYSTEM AND RELAY TO LOWER LATENCY

This application claims priority to U.S. Provisional Application No. 61/877,392 filed on Sep. 13, 2013.

This application pertains to systems, and methods for management, control and formation of custom data packets in order to provide low latency and including radio frequency (RF), free space optics (FSO), (collectively "wireless") and/or fiber optics transmission media.

This application herein incorporates by reference the disclosure of co-pending patent application filed Sep. 12, 2014, entitled, "Packet Sharing Data Transmission System and Relay to Lower Latency" U.S. application Ser. No. 14/484,602.

BACKGROUND

Ethernet and packet-switched Internet Protocol (IP) networks are systems for transmitting data between different points. These systems may be known as "point-to-point" or "contention-based" systems. In many circumstances all transmitters contend for network resources and all transmitters may transmit simultaneously. Due such transmission processes network resources may be oversubscribed, bottlenecks may occur or data may be delayed or lost, resulting in network impairment and high latency rates.

Conventional networks comprise a plurality of Local Area Network (LAN) endpoints, for example computers connected to an Ethernet LAN. Endpoints may be coupled to one or more LAN switches that connect to one or more additional LAN endpoints. If too many packets are simultaneously transmitted by other endpoints, the LAN switch may have a queue overflow, causing latency and/or packets to be lost. ("Packets" mean datagrams in a LAN or Wide Area Network (WAN) environment In a LAN environment, packets are sometimes called "frames." In a packet-switched WAN environment, packet-switching devices are normally referred to as "routers.").

Delivery protocols for resolving congestion and replacing dropped packets are well known, such as Transmission Control Protocol (TCP). But such solutions may be inappropriate for point-to-point environments and RF transmissions where latency below one microsecond is required, the round-trip propagation delay between stations is excessive and even the latency of waiting for another's single packet to be sent is excessive. Scheduling the transmission of packets by partitioning the packets into discrete frames and subframes is known in order to combat latency issues, but is insufficient in low latency systems. It is possible to schedule packets for delivery during time slots is the subframes corresponding, to empirically determined conditions, but there is can be a delay of a one to many subframes before data starts to flow for a given application. Based on the packet size and underlying network bandwidth, some varying fraction of each time slot would be actually used to transmit a packet. Assuming a packet size of 125 bytes (1,000 bits) and a 10BaseT Ethernet operating at 10 mbps, a single 100-microsecond time slot would be used to transmit each packet. With a packet size of 1,500 bytes, twelve of the 100-microsecond intervals would be consumed by each packet transmission.

Configuration maps are known to provide a data structure indicating time slots that have already been allocated to other transmitters for reception by the receiving node (or, alternatively, time slots that have not yet been allocated, or, alternatively, time slots that are candidates for transmission). A reception map is a data structure that indicates time slots during which transmission to the intended receiving node would not conflict with other transmitters. Although there are many ways of representing such a map, one approach is to use a bitmap wherein each bit corresponds to one time slot, and a "1" indicates that the time slot has been allocated to a transmitting node, and a "0" indicates that the time slot has not yet been allocated. If a 100-millisecond delivery interval were divided into 100-microsecond time slots, there would be 1,000 bits in the reception map. The reception map could be larger, for higher bandwidths, for example, for a 100 megabit per second link, the map could have 10,000 bits, etc., to represent the same throughput per slot.

Such processes for handling packets and the assignment of a packet handling identifier are known in order to share resources between retransmitted packets and other transceiver functions. A packet can be forwarded directly to another communication device (or layer) or it may have a specific packet handling identifier, such as a Quality of Service (QOS) level. The QOS level of a packet indicates the importance of certain service metrics of one or more packets. A QOS metric is delay (or latency) and Packet Error Rate (PER) and include Bit Error Rate (BER), data rate, delay variation (or jitter), packet loss rate or time, between error events (TBE). Voice or data (e.g., trading) traffic may have very low latency requirements and low packet-error rate.

Telecommunication networks use a wide variety of infrastructure methods for transmitting data depending on a variety of factors including the bandwidth of the connection, the need of Security for the data, the type of data being, transmitted, and the routing of the signals between the source and the destination. Many conventional methods compress the transmitted data into packets that include header information that is used by the network during the transmission process. The use of frames at the data link layer to transport a data payload from a packet may be referred to as "encapsulating" the data. Such conventional encapsulation methods include High-Level Data Link Control (HDLC), Point-to-Point Protocol (PPP) in HDLC-like framing. (Internet Engineering Task Force RFC 1662), Multiprotocol Encapsulation (MPE), Generic Stream Encapsulation (GSB), and Unidirectional Lightweight Encapsulation (ULE).

Well known transmission systems include the Ethernet protocol ISO/IEC 8802-3 (ANSI/IEEE Std. 802.3, 1993 edition) that defines a half-duplex media access mechanism and permits all stations to access network channel with equality. Each station includes an Ethernet interface card that uses carrier-sense multiple-access with collision detection (CSMA/CD) to listen for traffic on the media. A station having data to send will attempt to access the channel by waiting a predetermined time after the deassertion of a receive carrier on the media, known as the interpacket gap (IPG) interval is a full duplex environment referred to as IEEE 802.3x, Full Duplex with Flow Control-Working Draft (0.3). Traffic is not distinguished or prioritized over the medium. The full duplex environment provides a two-way, point-to-point communication link between two network stations so two stations can simultaneously transmit and receive Ethernet data packets between each other without collision. An example of data evaluation may include setting the first value of the frame delimiter to 0×C7 (11000111) and setting the second value of the frame delimiter to 0×47 (0.1000111).

The IEEE 802.3z Task Force has defined shared and full-duplex gigabit Ethernet Slot time of 512 bytes (4096 bits) is available without increasing the minimum frame length, and providing frame bursting in which a station sends several frames separated by the extend carrier symbols in a single burst. Gigabit Ethernet operates by a station operating according to the conventional CSMA/CD protocol when attempting to transmit the first packet.

IEEE 802.12-1995, "Demand Priority Access Method, Physical Layer and Repeater Specification for 100 Mb/s Operation," also known as the VG ANYLAN network, uses a centralized hub to arbitrate among the requests from network stations. The hub grants access to the stations in a round robin fashion and the VG ANYLAN network requires control by a central hub.

Prior art failover systems such as OSPF-TE require five seconds or more to recognize one link is unusable and when the RF link is up but has a high Bit Error Rate (BER) there may be no failover at all. Once failover is achieved, all of the dropped packets are lost in a UDP/IP low-latency network. Once the RF system returns to normal it may take considerable time for the system to start using RF link again.

However, none of the above systems sufficiently resolve latency issues where gigabit or higher transmissions of data, such as electronic trading, which must have minimal latency and few or no missed packets. Also, each of the above systems fail to provide data transmission with consistently low latency. A system that improves upon the above technologies and protocols that provides data transmission with latency rates below the single, minimum-sized-packet serialization time is needed for point to point networks.

SUMMARY

The invention provides a method of forming a custom data packet for a point-to-point trunk network, the method comprising the steps of providing a First-In First-Out (FIFO) register to capture data packets transmitted via a packet-switched computer network at speeds equal to or greater than 1 Gbps, the packet switched data packets having a packet switched header and a packet switched frame check sequence (FCS). The method provides selectors connected to the FIFO outputs, each selector receiving a packet-switched data packet and stripping out the packet-switched header and replacing it with a mini-header, filling each stripped data packet with 1 to 1,500 bytes of customer data to transform each data packet to a high payload data packet; replacing the packet-switched PCS with a mini-FCS, sending each high payload data packet across the point-to-point trunk network having a reduced latency of less than 1 microsecond for roundtrip transmission and recreating the standard packet-switched data packet based on the mini-header and mini-FCS.

In an embodiment the mini-header comprises a header of 8 bits or less. In an embodiment the mini-FCS comprises an PCS of 8 bits or less. In an embodiment the mini-header replaces a minimum gap and preamble of the standard data packet header and the recreated packet is compliant with Ethernet IEEE 802.3 protocol, in an embodiment the mini-header is created based on a MAC address, IP address and a destination port of the packet-switched, data packet according to the following look-up table so if the MAC address, IP address and destination port have been seen before, using the previously assigned packet-switched mini-header byte or if the MAC address, IP address and destination port are new, assigning a new mini-header byte to the combination and forwarding the packet-switched header the first time only or if the combination of MAC address, IP address and destination port are new, but all of the mini-header bytes have been previously used, reuse the byte code that was used the longest time ago and send the packet-switched header the first time only.

In an embodiment the method includes removing Ethernet gap, preamble, header and FCS of the packet-switched data packet and replacing with a single byte header and single byte FCS. In an embodiment, the method provides selectors, a FIFO register, trunk network, trunk frame, trunk fragments and customer ports $C_1$ to $C_n$. In an embodiment selectors are connected to a FIFO output, each selector capable of mapping individual incoming data bits from different customer ports and combining the incoming data bits into trunk fragments where the number of bits in each trunk frame is a pro rata share of the bandwidth designated to each customer ports $C_1$ to $C_n$. In an embodiment the method includes filling each trunk fragment with data bits from customer ports $C_1$ to $C_n$, by selector values tor each customer, repeating the tilling step for each trunk fragment until sufficient trunk fragments form a filled trunk frame, sending each filled trunk frame across the trunk network having a transmission rate that is less than the sum of all customer incoming bandwidths but equal to the sum of the trunk bandwidth allocation for all customers and transmitting the filled trunk frames from the first incoming packet-switched computer network, through the bandwidth-limited trunk to the second packet-switched computer network and on to an intended receiving network endpoint and receiver capable of error detection and repair.

In an embodiment the receiver inserts zeroes in a FIFO register to indicate a packet which the single byte FCS and trunk frame FCS show that repair is needed of a recreated packet at the FIFO register. In an embodiment the method includes filling a 16-bit trunk fragments using 4-bit selectors to select each customer data bits to combine data fragments of multiple customers in each data packet in order to reduce latency and providing selectors that receive data bits from every customer on the first incoming packet-switched computer network as soon as the first data bits arrive without waiting for a complete data packet from any customer. In an embodiment the method Includes resetting the selectors, using the XOR LUT and beginning the next trunk frame with no break or idle section between filled trunk frames and encrypting customer data by combining all customer bits using the XOR scrambler bits, the pro rata share for all customers, the method used to spread customer data within trunk frames and the map which divides up customer bits by timeslice.

In an embodiment data packets are sent using configurable logic blocks (CLB) and wherein the CLB is a layer 1+field-programmable gate array (FPGA) or application specific integrated circuit (ASIC), the first packet switched computer network providing a relay for point-to-point wireless, Infiniband or Ethernet transmissions. In an embodiment latency is below 1 microsecond round-trip, assuming a trunk transmission speed of at least 10 Mbps.

Further, the invention provides a method of creating and transmitting custom data packets for transmission over a point-to-point trunk network, comprising the steps of providing a First-In First-Out (FIFO) register having sixteen, four bit selectors, each selector capable of stripping a standard data packet header, replacing the standard data packet header with a mini-header having less than 16 bits within the stripped data packet, filling each stripped data packet with 1 to 1,500 bytes of customer data and transforming a standard data packet to a high payload packet and transmitting each high payload packet across a point-to-point trunk network.

In an embodiment the mini-header comprises a header of 8 bits or less. In an embodiment the mini-header is created based on a MAC address, IP address and destination port of the standard data packet. In an embodiment the method includes removing Ethernet gap, preamble, header and frame check sequence (PCS) of the standard data packet and replacing with a single byte header and single byte PCS. In an embodiment the method includes establishing a unique identification number corresponding to the contents of the header of the standard data packet. In an embodiment the receiver inserts zeroes in a FIFO register to repair a recreated packet.

In an embodiment the method includes transmitting a standard data packet across a trunk network as a lead transmission packet and recreating a standard data packet based on the composition of the lead transmission packet header.

Also, the invention provides a low latency relay comprising a receiver for capturing incoming data packets, each receiver capable of stripping the Incoming data packet header, a selector capable of tilling each stripped date packet with customer data and selectors repeating the filling sequence for each data packet to provide multiple high payload packets. In an embodiment the stripped data packed has a mini-header inserted that comprises a header of 8 bits or less. In an embodiment the mini-header replaces a minimum gap and preamble of the standard data packet header. In an embodiment the mini-header is created based on a MAC address, IP address and destination port of the standard data. In an embodiment the Ethernet gap, preamble, header and frame check sequence (FCS) of the incoming data packet are removed and replaced with a single byte header and single byte FCS. In an embodiment multiple incoming data packets having payload capacity for customer data from 16 bytes are transformed to custom data packets having at least 50 bytes, providing a high payload packet.

In an embodiment a selector is capable of mapping incoming data hits from different customer ports and combining the incoming data bits into trunk fragments where the number of bits in each trunk frame is a pro rata share of the bandwidth designated to each customer $C_1$ to $C_n$, the selector filling a trunk fragment with data bits from customer ports $C_1$ to $C_n$; the selector repeating the filling of trunk fragments to fill a trunk frame and a sender transmitting each filled trunk frame across a trunk network.

Finally, the invention provides a logic device providing high payload data packets comprising logic blocks, providing a receiver for capturing incoming data packets, each receiver capable of stripping the incoming data packet header, a selector capable of filling each stripped data packet with customer data and selectors repeating the filling sequence for each data packet to provide, multiple high payload packets.

In an embodiment the stripped data packed has a mini-header inserted that comprises a header of 8 bits or less. In an embodiment the mini-header is created based on a MAC address, IP address and destination port of the standard data. In an embodiment the Ethernet gap, preamble, header and frame check sequence (FCS) of the incoming data packet are removed and replaced with a single byte header and single byte PCS and the logic device comprising a Field Programmable Gate Array (FPGA).

While the invention is amenable to various modifications and alternate forms, specific embodiments have been shown by way of example in the drawings and will be described in detail, it should be understood that the intention is not to limit the invention to the particular embodiments described. The intention is to cover ail modifications, equivalents and alternatives falling-within the spirit and the scope of the invention.

DETAILED DESCRIPTION

Figure 1:
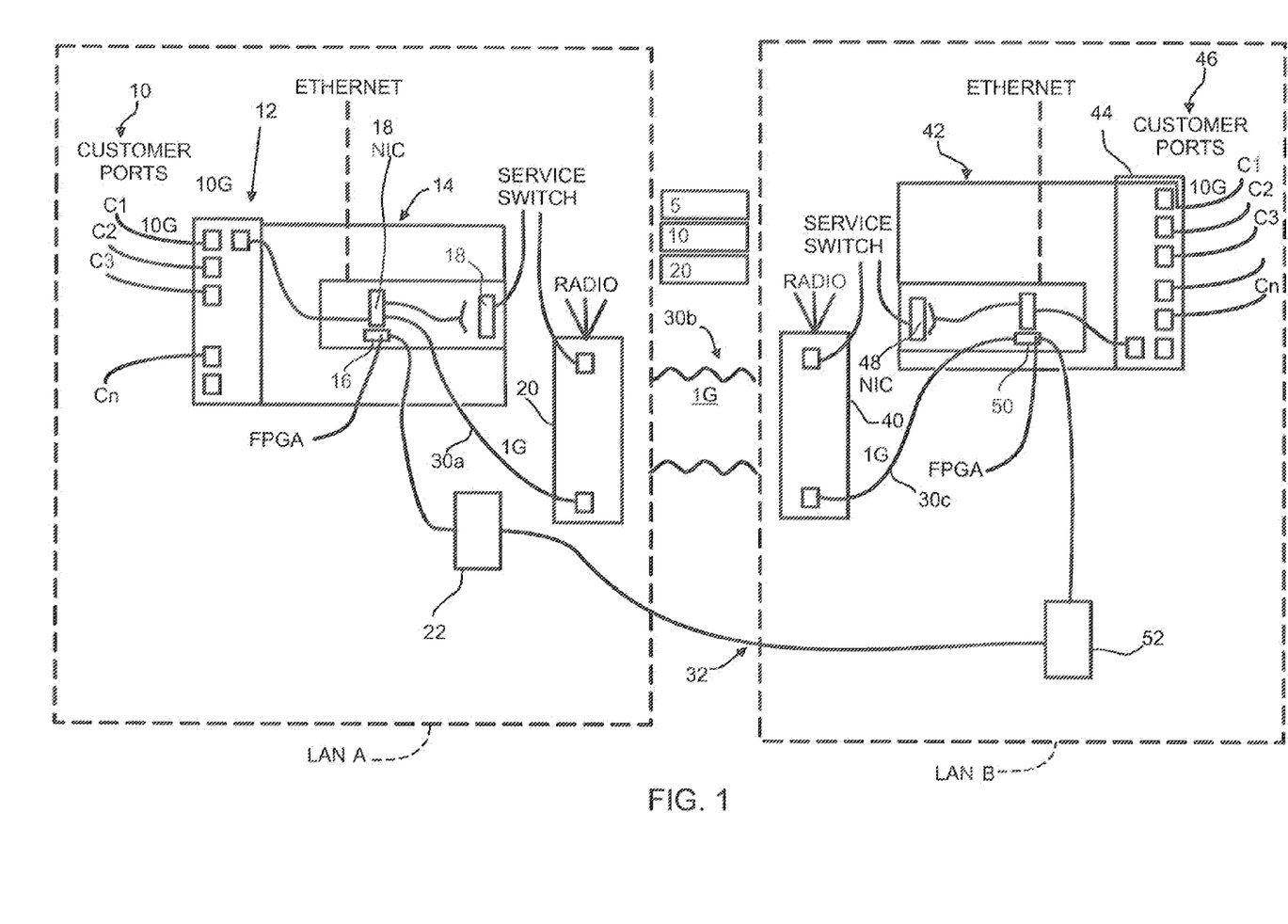
FIG. 1 depicts a schematic view of the components present invention.

The overall architecture of the present invention may be understood with respect to FIG. 1. However, other layouts and system architecture and equipment may be used to accomplish the present invention and the components of FIG. 1 provide a single example to accomplish such invention. Local Area Network (LAN) A is exemplary of a central routing station or data center that receives incoming data from multiple customers $C_1$-$C_n$ via fiber optic or copper cabling 10 (LAN A) or 4b (LAN B), In the preferred embodiment, the data is transmitted from customers at 10 Gigabit speeds (G) and are received by either a switch/relay 12 or an appliance that eliminates the switch and can handle multiple, simultaneous 10 G or faster transmissions. For example, many 10 G small form factor pluggable transceivers (SFP), Quad SFP (QSFP) or SFP+ may be used by the switch/relay or appliance to receive the incoming data. Multiple switches 12 or appliances may be provided at the data center for receiving data from hundreds or thousands of customers. Each switch is connected to a server/relay 14, or each appliance such as relay 14 embodies both the switches and server, preferably also capable of receiving and transmitting data at 10 G. Bach server/relay 14 or appliance includes multiple network interfaces 18 to send, receive, control and manage the data packets.

In an embodiment, a logic device 14 such as a Field Programmable gate Array (FPGA) may provide data management, network interface and packet control. For example, a Xilinx 7 Series FPGA with thousands of configurable logic block (CLB) may be programmed to accomplish many of the functions of the present invention. (Although "FPGA" is denoted throughout the application, any functionally equivalent electronic circuit or logic device may be used for this invention.) Other types of chips or logic devices may be used for data management, network interface and packet control, such as an ASIC. The server/relay 14 or appliance also includes a network interface card (NIC) 18 which aids In the transmission of the data. In a preferred embodiment, the data is simulcast via a radio 20 which transmits using free space optics (FSO) or a microwave (MW) radio frequency (RF) or a millimeter wave (MMW) RF in multiple hops by line of sight transmission of data at 1 G transmission rate or higher to targeted receivers/antennas via point-to-point trunk network 30b to obtain the data on a second local area network (LAN) B. In an embodiment, LAN A and LAN B may include a packet switched computer network providing transmissions to 10 Gbs.

In a preferred embodiment, data is simulcast via fiber optic cables or a second RF link using a disparate route to LAN B. A transmitter 22 transmits the data across fiber optic cables 32 or second RF link to the receiving LAN B. A transmitter 22 transmits the data across fiber optic cables 32 to the receiving LAN B. Due to the high importance of receiving data without error and to limited latency, the simulcasting of data across wireless transmission 30a and fiber cables 32 provides the needed redundancy in order to avoid dropped packets. As is well known RF transmissions are affected by weather and on bad weather days the fiber optic transmission means 32 (while not as fast as RF transmissions) may be preferred on such days/stormy periods.

Local area network B represents a receiving location, such as a stock exchange or electronic trading facility. Wireless signals are received by radio 40 and transmitted at 1 G or higher speeds via fiber link 30c to server/relay 42 or appliance which includes a network interface card 48 and a motherboard network interface 50 including a MAC layer, for example, on an FPGA (maybe interchangeable with an ASIC). Receiver 52 receives fiber optic or second wireless data from the cable 32 which is transmitted to the server/relay 42. The server is connected to switches 44 or appliances which include transceivers for transmitting data across fiber optic lines or copper lines 46 to customers. The switches may use QSFP transceivers, SFP transceivers or SFP+ transceivers to provide 40 G speeds or higher. In an embodiment, each customer port $C_1$-$C_n$ has a transceiver for transmitting and receiving data bits/packets, Turning to FIG. 2, the-mother board 60 within the server 14, 42 is depicted. The board 60 includes a universal serial bus (USB) 62 for receiving data from a server/relay 90. The data from the USB connection is transmitted from the board to a single processing unit such as FPGA 16. The board 16 also includes a Joint Task Action Group (JTAG) interface 64 under IEEE 1149.1-1990 provides an interconnect between the USB and the user logic 66 of the FPGA. The JTAG 64 provides a serial connection to the FPGA 16 and facilitates programming of the FPGA 16. The functionality of the configurable logic block (CLE) of the user logic 66 will be explained in more detail below. The media access control (MAC) 68 receives the instructions from the user logic 66 that are transmitted via the physical code in sublayer (PCS) then through the physical medium attachment (PMA). And via the GTX filter circuit 72, 74 to transmit the data from the FPGA to the QSFP or SFP+ transceivers 76.

Figure 2:
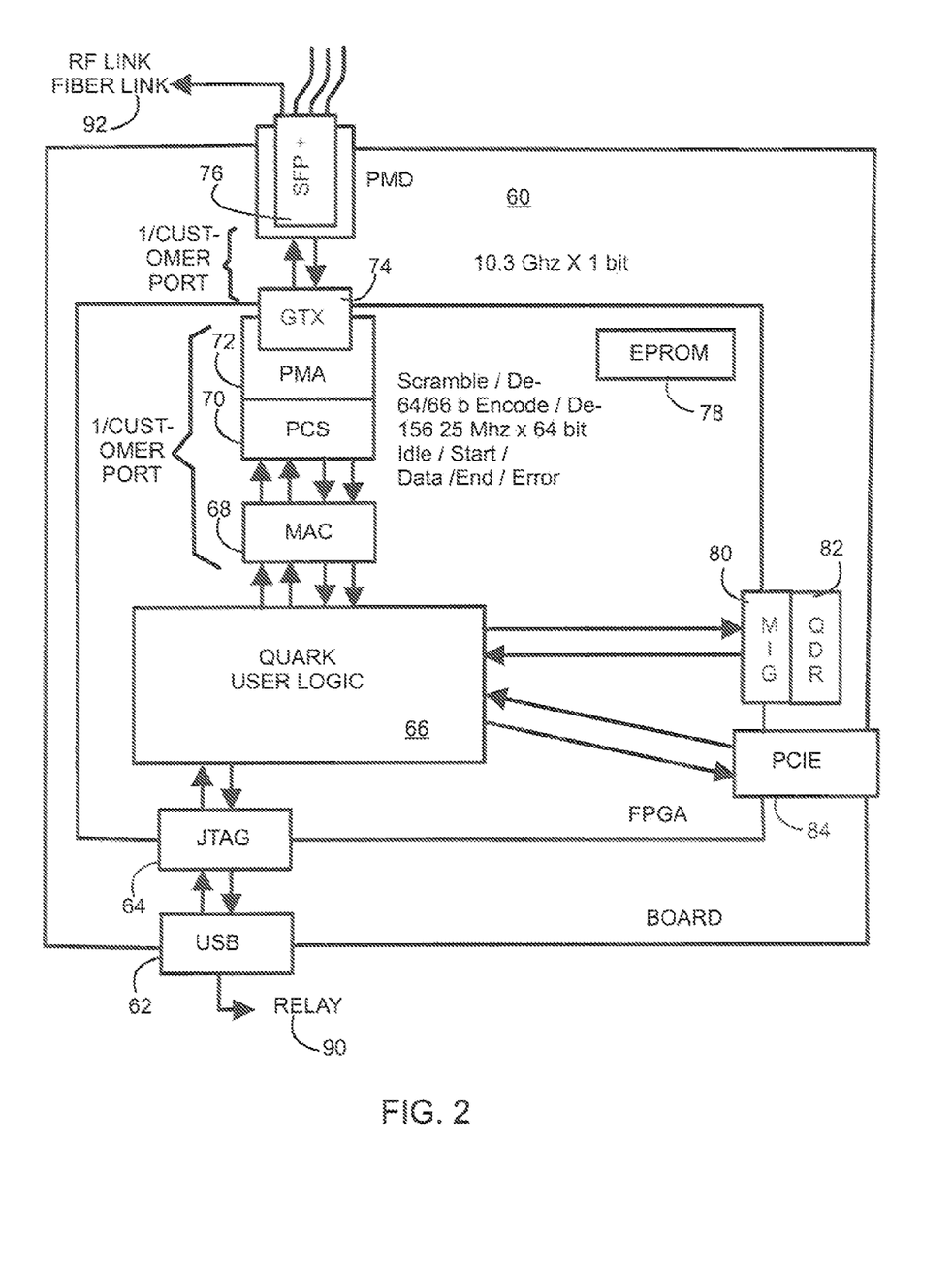
FIG. 2 depicts a board layout view of components of the present invention.

The FPGA 16, 50 may also include an-erasable programmable read-only memory (EPROM) 78 as a back-up to store the user logic. A memory interface MGI and QDR 82 are provided by the FPGA for interlacing with the user logic 66. Peripheral component interconnect express (PCIE) 84 is also provided with the FPGA to interact with the user logic 66.

Turning to FIG. 2, the network interface 16 is preferably a single-chip, 32-bit or 64-bit electronic circuit Ethernet controller (e.g. FGPA), and provides an interface between a local bus of a computer, for example, a peripheral component interconnect (PCIE) 84 local bus, and an Ethernet-based gigabit or faster media. The PCIE bus interface unit may be under the control of the DMA buffer management unit receives data that is passed, to the PCI bus transmit FIFO buffer described below. The PCIE 84 may be used to dump the bad packets from the receiver 206. A transceiver 76 may send and receive data packets on the network media at gigabit rates across a physical layer device (e.g., a SFP or four gigabit serial, transceiver).

In alternate embodiments the network interface 16, 50 may also include a PCI bus interface unit, a direct memory access (DMA) buffer management unit and a network interface portion 16, 50. The network interface portion may include an extended Gigabit Media Independent Interface (XGMII) 23b for connecting external 1000 Mb/s or 10000 Mb/s transceivers, an External Address Detection Interface (EADI) 23c, and an 64b/66b decoder 24. Full-duplex operation can be performed by the XGMII interface. The interface may also include, an LED control and an expansion bus interface for boot RAM (e.g., EPROM or Flash memory) daring startup, and an IEEE 1149.1-compliant JTAG Boundary Scan test access port interface. The network interface 16, 50 may also include a network port manager and an auto-negotiation unit that communicates via the media with a corresponding auto-negotiation unit in the hub serving the network interface with a corresponding auto-negotiation unit in a centralized hub, repeater, or switch that provides shared receive carrier and collision signals between different network stations.

As depicted in FIG. 2, the GTAG 64 manages the reception of the data by the network interface unit 16, 50 and retrieves information form header bytes that are transmitted at the beginning of transmissions. The header information (identifying the byte length of the received frame) is passed to the FIFO control of the user logic 66.

The above-described MAC 68 may be configured to operate in a shared ten gigabit Ethernet-network by providing a burst of data packets. Asynchronous data or packetized data can be arranged as datagrams, using the User Datagram Protocol (UDP) and the Internet Protocol (IP). UDP/IP are the fragmented datagrams placed in an IP packet format The UDP/IP packet is forwarded across a network and the transport and networking layer of the OSI reference model can be sent according to a data layer or physical layer of the OSI reference model according to the Ethernet protocol. The datagrams can be removed from the Ethernet protocol and sent using a different protocol if desired. A PHY transceiver and, specifically, the PHY receiver portion, can decode and recognize 64B/66B encoded data associated with the Ethernet protocol. If the sample rate is 48 MHz, the total bit rate of the network between any two nodes is 48 Mlframes sec.×64 bytes/frame×8 bits/byte=24.576 Gbits/sec.

When an electronic circuit logic device such as an FPGA 16 is activated or "powered up," routing tables are broadcast across the control channel to each of the other devices upon the network. The control channel includes configuration (or reconfiguration) routing tables needed to accommodate data transfer between the newly activated device. The routing table is created to accommodate all of the various channels or frame portions established to receive the various types of data. Data is synchronously sent across the network between activated devices. The routing table within a memory medium will then identify which bytes within a frame is associated with a particular channel when subsequent communication is desired. In order to use an existing Ethernet PHY, the compliant network transmission protocol must use 64B/6B coding which Ethernet uses. The recovered clock is available since the Ethernet PHY must generate it to recover data in Ethernet mode.

The Ethernet MAC 68 may have a learning session Ethernet MAC frame and a compression session Ethernet MAC frame and may be divided into a first portion comprising two MAC address fields, and a second portion comprising a rest of the unmodified Ethernet MAC-frame.

In an embodiment, the network interface card 18, 48 may have four ports. Port 1 for FR, port 2 for fiber, port 3 for customer transmissions and port 4 for free space optics. However, in an alternate embodiment, the system may be updated to provide between four and thirty-two ports. For example, in a system having 24 ports, there will be 20 extra ports for customer customization. In addition, some of these extra ports maybe used for monitoring and controlling the system using out-of-band data communications. In addition, the system may have additional non-Ethernet ports for communication between multiple instances, of the system, such as in a Y network layout, where three of the systems will sit in the same rack and communicate between themselves. For example, each of the 20 extra ports may be for a specific customer input. In that way the data packets received at each port will have a designation provided by the port where the data is received. By providing port designations to the data, the packet header information may be reduced—due to the easier management of data incoming from each designated port. In this way the data packets can be managed at a layer one level requiring less handling at layer two of the Ethernet and lower latency.

Figure 3:
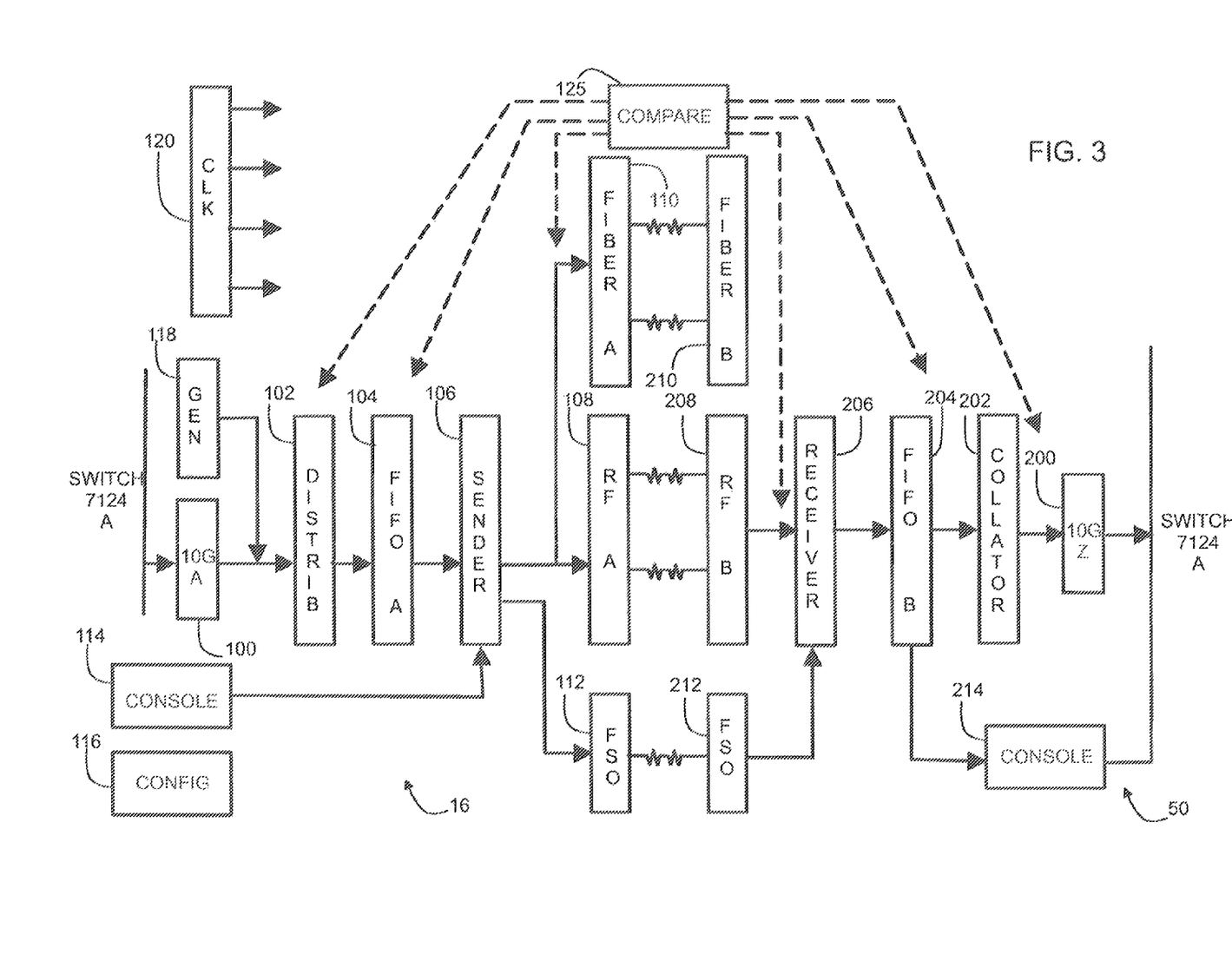
FIG. 3 depicts a schematic view of the functionality of a relay of the present invention.

Turning to FIG. 3, the user logic 66 of the FPGA will be described. The left side of the diagram of FIG. 3 represents the logic device or FPGA 16 of the server 14 located in LAN A and the right side of the diagram of FIG. 3 represents the logic device or FPGA 50 located in server 42 of LAN B. The user logic 66 of the FPGA 16 includes a distributor 102 for receiving 10 G transmissions 100. For example, a 64 bit packet would be received by the distributor 102 and is loaded into the First-In-First-Out (FIFO) register 104;

The FIFO 104 functionality will be described in more detail below. Once the FIFO processing is completed, it transfers the 64 bit data to Sender 106 which transmits the data out of the FPGA as discussed above using transceivers such as a QSFP 76 or other transceiver and simulcast as discussed above through wireless radio 108, a fiber transmission 110 and free space optical transmission 112.

These transmissions are monitored by Console 114. In an embodiment, the Console can also run diagnostic testing at night when the system is inoperable or very few transmissions occur. Configuration block 116 also interacts with the user logic and provides for configuration of the FPGA 16 when the system is not running—usually at night. A Generation block 118 interacts with the Distributor 102 and a clock 120 manages the running of the FPGA 16. A Compare program 125 also monitors data transmission between the FPGAs 16 and 50.

The data transmitted from the FPGA 16 from LAN A is transmitted via simulcast to LAN B (FIG. 1) and is received by the server/relay 42 including FPGA 50 (FIG. 3). Wireless data is received by wireless radio 208 (FIG. 3) which transmits the packets to receiver 206, which are loaded into the FIFO 204. A more detailed description of FIFO 204 will be described below with respect to the present invention. The FIFO 204 transmits its data to the Collator 202, which transmits out of the server/relay via 10 G speeds, preferably.

The FPGA 50 also includes data packet transmissions via fiber 210, which is linked to the Receiver 206 for receiving the data transmission. A free space optical (FSO) transceiver 212 receives fiber transmission and links to the Receiver 206. A Console 214 receives monitoring data from the Receiver 206.

The present invention provides for a system to reduce the latency of transmission and increase the available bandwidth to a customer by removing the Ethernet gap, preamble, header and frame check sequence (FCS); and replace-them with a single byte header and a single byte FCS on the transmitting side (A in FIG. 1), prior to the RF link 30 (FIG. 1). On the receiving side 30 (FIG. 1) the system rebuilds a normal Ethernet packet including all components, which may then be transmitted by normal means on ten-gigabit or faster Ethernet to the customer server 42 (FIG. 1). For a minimum size packet of 64-bytes (which is 5 bytes of gap, 8 bytes of preamble, 44 bytes of header and 4 bytes of FCS) that leaves only 16-bytes for customer data and provides a reduction of 77 bytes into 18 bytes. If the customer only sends one byte of payload, this is a reduction of 77 bytes to 3 bytes transmitted across the RF link and greatly reduces latency of the transmission. Because the latency is reduced, not only are packets received more quickly on the far end, alter the RF system, the packet buffer on the near side, prior to the RF system is drained more quickly, allowing a customer to send more packets and more bytes of data in the same amount of time.

Figure 4:
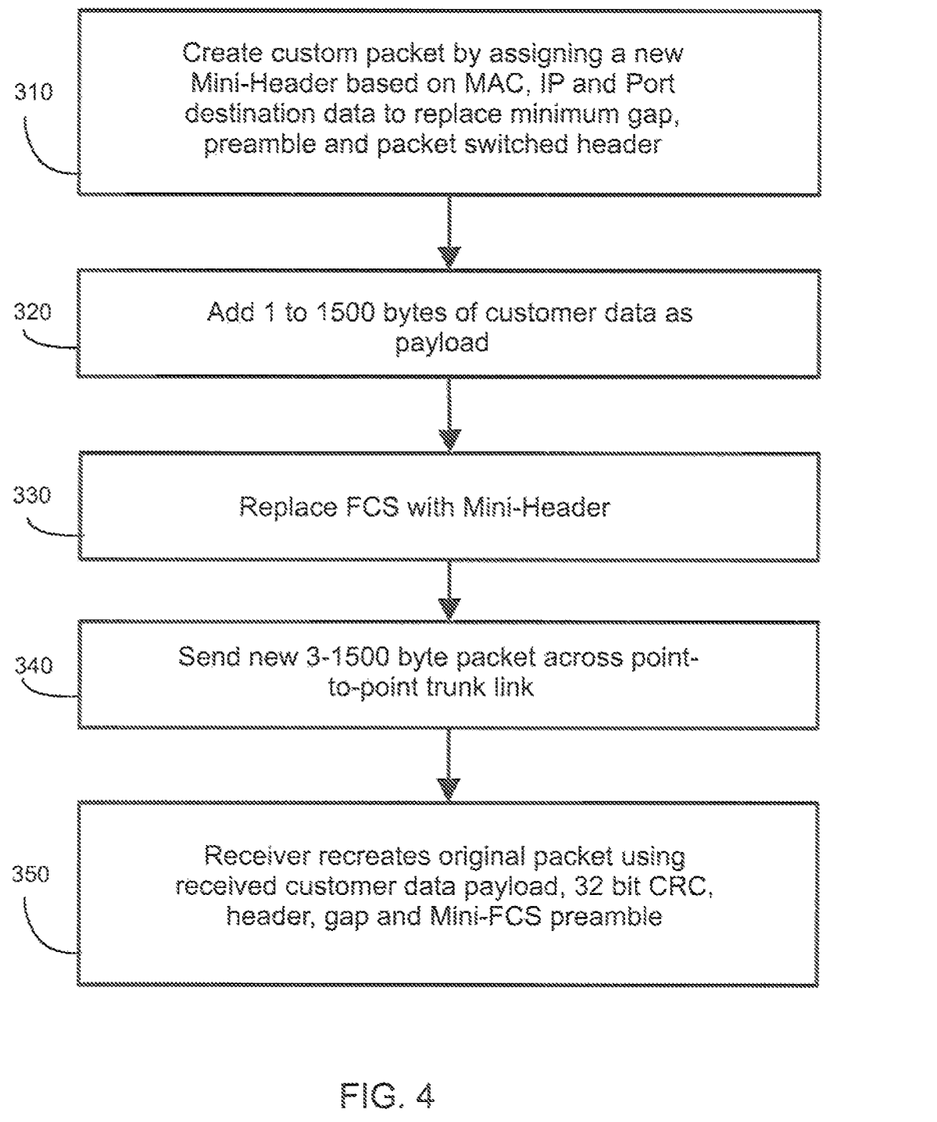
FIG. 4 depicts a flow diagram outlining the operation of an embodiment of the present invention.

The invention as described in FIG. 4, provides a method of forming a custom data packet for a point-to-point trunk network 108, 110, 112, 208, 210, 212 (FIG. 3). A First-In First-Out (FIFO) register 104 to capture data packets transmitted via a packet-switched computer network (LAN A) at speeds equal to or greater than 1 Gbps. The packet switched data packets having a packet switched header 310 (FIG. 4) and a packet switched frame check sequence (FCS) 330. Selectors connect to the FIFO outputs 104 (FIG. 3). Each selector receiving a packet-switched data packet. The selector strips out the packet-switched header and replaces it with a mini-header and each stripped data, packet is filled with 1 to 1,500 bytes of customer data 340 (FIG. 4) to transform each data packet to a high payload data packet. The packet-switched FCS is replaced-with a mini-FCS 350. Each high payload data packet is sent across the point-to-point trunk network 108, 110, 112, 208, 210, 212 (FIG. 3) having a reduced latency of less than 1 microsecond for roundtrip transmission. The standard packet-switched data packet is recreated based on the mini-header and mini-FCS. By replacing the original customer FCS with a smaller FCS there is more room for customer data payload.

In an alternate embodiment, the 32 bit CRC (cyclic redundancy check) may be replaced with an 8 bit CRC. A new 3 to 1500 byte packet can be sent across the point-to-point RF link 30 (FIG. 1). The receiver 206 (FIG. 3) may recreate the original packet using the received customer data payload, 32 bit CRC, header, gap and preamble. Having the reassembled packet including 32-bit CRC, the packet is compliant with Ethernet protocol and may then be transmitted by the collator 202 (FIG. 3) via 106 transceiver to a switch or server 42 (FIG. 1).

For example, the parts of a header such as the destination MAC, the destination IP and the destination port can be stripped and given a unique identification number using only 8 bits. In an embodiment, the first packet will go across the point-to-point link with a full 48 bytes so that the receiver obtains the full header information. The following packets may be transmitted with the 8-bit header replacing the full header. So that when a packet with an 8-bit header is received, the receiver can reassemble a new full header based on the first packet having the full header information. In an embodiment, if the receiver 206 (FIG. 3) detects errors, it may insert zeroes in a FIFO location that will result in dropping the specified customer packet. For example, the pseudo code below illustrates an embodiment of the invention.

The above described functionality may be implemented in any point-to-point or serial transmission type system and is illustrated in the following pseudo code;

| Pseudo-Code for High Payload Packet |
|---|

```
while( incoming_customer_data ) begin
   if( is_first_bytes ) begin
      mini_hdr <= lookup( MAC_addr, dest_ip_addr, dest_ip_port );
      if( is_found( mini_hdr ) )
         drop_header_bytes( );
      else
         add_mini_hdr( mini_hdr ); // Do not drop the header bytes if the mini-header is new.
   end
   if( is_last_bytes ) begin
      replace_fcs_with_mini_fcs( );
      bytes <= mini_hdr; // Add the mini-header to the end of the packet.
   end
  end
  else
     send_idle_bytes( );
 On the receiving side of the trunk;
 while( incoming_trunk_data ) begin
    if( is_last_bytes ) begin
       check_fcs( fcs_bytes ); // Check the mini-FCS.
       mini_hdr <= mini_hdr_bytes;
       if( is_new( mini_hdr ) )
          store_packet_hdr, full_hdr ); // Store away the packet header for this mini_hdr.
       else
          rebuild_packet_hdr( mini_hdr ); // No need to rebuild if this is the first time we have
 seen this header.
       generate_full_fcs( );
    end
 end
```

In an embodiment, further lowering of latency can be achieved by combining the above described payload altering system with a system for packet sharing as described in co-pending application by the same assignee as to this application, described as follows: The sender 106 (FIG. 3, 5) creates a 77×16 frame with 16 possible bit positions; a single selector per customer that uses a 6 bit value puts bits in sequence into proper sender bit locations; the sender 106 has 16 selectors that take 4 bit values to select and easterner fills each sender bit. The system provides a First-In First-Out (FIFO) register to capture incoming data bits from each customer port In parallel and speeds equal to or greater than 1 Gbps, providing selectors connected to the FIFO outputs. Each trunk fragment receives data bits from customer ports, by selector values for each customer. The invention provides selectors connected to the FIFO outputs, each selector capable of mapping individual incoming data bits from different customer ports and combining them into the same trunk fragments where the number of bits in each trunk frame is a pro rata share of the bandwidth designated to each customer ports C1 to Cn, The filling sequence for each fragment is for each sender 16 bit frame, then providing different selector values for each frame until a custom 1,248 bit trunk frame is ready for point-to-point transmission from the sender 106 (FIG. 3, 5). So in combination with the payload altering system of the present invention, latency is drastically reduced down to 0.024 microseconds for round trip transmission in some embodiments.

Numerous variations and modifications will become apparent to those skilled in the art once the above disclosure is fully appreciated. It is intended that the claims be interpreted to embrace all such variations and modifications.

The invention claimed is:

1. A method of forming a custom data packet for a point-to-point trunk or Infiniband network, the method comprising the steps of:

receiving and storing in a First-In First-Out (FIFO) register data packets, said data packets being standard data packets transmitted via a packet-switched computer network at speeds equal to or greater than 1 Gbps, the packet switched data packets having a packet switched header and a packet switched frame check sequence (FCS);

in each of a plurality of selectors connected to the FIFO outputs, receiving a packet-switched data packet and stripping out the packet-switched header and replacing said packet-switched header with a mini-header wherein the mini-header is created based on a MAC address, an IP address and a destination port of the packet-switched data packet according to the following look-up table:

a) if the combination of the MAC address, the IP address and the destination port has been identified before, using a packet-switched mini-header byte previously assigned to said combination as the mini-header;

b) if the combination of the MAC address, the IP address and the destination port has not been identified before, assigning a new mini-header byte to said combination and using said new mini-header byte as the mini-header and forwarding the packet-switched header the first time only; and c) if the combination of the MAC address, the IP address and the destination port has not been identified before, but all of the mini-header bytes have already been assigned, assign the oldest mini-header byte that was assigned the longest time ago to said combination and using said oldest mini-header byte as the mini-header and forwarding the packet-switched header the first time only;

filling each stripped data packet with 1 to 1,500 bytes of customer data to transform each data packet to a high payload data packet;

replacing the packet-switched FCS with a mini-FCS;

sending each said high payload data packet comprising said mini-header and said mini-FCS across the point-to-point trunk network having a reduced latency of less than 1 microsecond for roundtrip transmission; and
recreating the standard data packet based on the mini-header and the mini-FCS.

2. The method of claim 1 wherein the mini-header comprises a header of 8 bits or less.

3. The method of claim 1 wherein the mini-FCS comprises an FCS of 8 bits or less.

4. The method of claim 3 wherein the mini-header replaces a minimum gap and preamble of the standard data packet header and the recreated packet is compliant with Ethernet IEEE 802.3 protocol.

5. The method of claim 1 further comprising the step of removing Ethernet gap, preamble, header and FCS of the packet-switched data packet and replacing with a single byte header and single byte FCS.

6. The method of claim 1 further comprising the step of:
providing selectors, a FIFO register, trunk network, trunk frame, trunk fragments and customer ports $C_1$ to $C_n$;
providing selectors connected to a FIFO output, each selector mapping individual incoming data bits from different customer ports to trunk fragments and the selector combining the incoming data bits into trunk fragments where the number of bits in each trunk frame is a pro rata share of the bandwidth designated to each customer port $C_1$ to $C_n$;
filling each trunk fragment with data bits from customer ports $C_1$ to $C_n$, by selector values for each customer;
repeating the filling step for each trunk fragment until sufficient trunk fragments form a filled trunk frame;
sending each filled trunk frame across the trunk network having a transmission rate that is less than the sum of all customer incoming bandwidths but equal to the sum of the trunk bandwidth allocation for all customers; and
transmitting the filled trunk frames from a first incoming packet-switched computer network, through the bandwidth-limited trunk to a second packet-switched computer network and on to an intended receiving network endpoint and a receiver for error detection and repair.

7. The method of claim 6 wherein the receiver inserts zeroes in a FIFO register to indicate a packet which a single byte FCS and a trunk frame FCS show that repair is needed of a recreated packet at the FIFO register.

8. The method of claim 7 further comprising the step of filling of a 16-bit trunk fragments using 4-bit selectors to select each customer data bits to combine data fragments of multiple customers in each data packet in order to reduce latency and providing selectors that receive data bits from every customer on the first incoming packet-switched computer network as soon as the first data bits arrive without waiting for a complete data packet from any customer.

9. The method of claim 8 further comprising the step of resetting the selectors, using an XOR LUT at an end of one trunk frame and a beginning of the next trunk frame with no break or idle section between filled trunk frames and encrypting customer data by combining all customer bits using the XOR LUT to scramble bits with respect to the pro rata share for all customers in order to spread customer data within trunk frames and divide up customer bits by timeslice.

10. The method of claim 1 wherein data packets are sent using configurable logic blocks (CLB) and wherein the CLB is a layer 1+ field-programmable gate array (FPGA) or application specific integrated circuit (ASIC), a first packet switched computer network providing a relay for point-to-point wireless, Infiniband or Ethernet transmissions.

11. The method of claim 1 wherein the selectors are connected to a FIFO output, each selector mapping individual incoming data bits from different customer ports and combining the incoming data bits into trunk fragments where the number of bits in each trunk frame is a pro rata share of the bandwidth designated to each customer ports $C_1$ to $C_n$ ; wherein the trunk fragments fill a trunk frame and latency is below 1 microsecond round-trip, wherein a trunk transmission speed of at least 10 Mbps.

12. The method of claim 1 further comprising the steps of:
providing a First-In First-Out (FIFO) register having sixteen, four bit selectors, each selector stripping a standard data packet header;
replacing the standard data packet header with a mini-header having less than 16 bits within the stripped data packet;
filling each stripped data packet with 1 to 1,500 bytes of customer data and transforming a standard data packet to a high payload packet; and
transmitting each high payload packet across a point-to-point trunk network.

13. The method of claim 1 wherein the mini-header is created based on a MAC address, Infiniband signature, IP address and destination port of the standard data packet.

14. The method of claim 1 further comprising the step of establishing a unique identification number corresponding to the contents of the header of the standard data packet.

15. The method of claim 1 wherein the receiver inserts zeroes in a FIFO register to repair a recreated packet.

16. The method of claim 1 further comprising the step of transmitting a standard data packet across a trunk network as a lead transmission packet and recreating a standard data packet based on the composition of the lead transmission packet header.

17. The method of claim 1 including a low latency relay comprising:
a receiver for capturing incoming data packets, each receiver stripping the incoming data packet header;
a selector filling each stripped data packet with customer data; and
selectors repeating the filling sequence for each data packet to provide multiple high payload packets.

18. The method of claim 1 wherein multiple incoming data packets having payload capacity for customer data of 16bytes are transformed to custom high payload data packets having at least 50 bytes.

19. The method of claim 1 including a logic device providing high payload data packets comprising:
configurable logic blocks (CLB) providing:
a receiver for capturing incoming data packets, each receiver stripping the incoming data packet header;
a selector filling each stripped data packet with customer data; and
selectors repeating the filling sequence for each data packet to provide multiple high payload packets.

20. The method of claim 19 wherein the configurable logic device comprising a Field Programmable gate Array (FPGA) or Application Specific Integrated Circuit (ASIC).

* * * * *